(12) United States Patent
Clark et al.

(10) Patent No.: US 6,370,197 B1
(45) Date of Patent: Apr. 9, 2002

(54) VIDEO COMPRESSION SCHEME USING WAVELETS

(75) Inventors: Derek Rand Clark; Teddy Paul Roberts, both of Fort Wayne; Lucinda Ellen Schafer, Auburn; Kenneth Alan Stocker, Spencerville, all of IN (US)

(73) Assignee: Memorylink Corporation, Neenah, WI (US)

( * ) Notice: Subject to any disclaimer, the term of this patent is extended or adjusted under 35 U.S.C. 154(b) by 0 days.

(21) Appl. No.: 09/360,388

(22) Filed: Jul. 23, 1999

(51) Int. Cl.[7] .................................................. H04N 7/30
(52) U.S. Cl. ........................ 375/240.19; 375/240.11; 708/203; 708/401; 709/247
(58) Field of Search .................... 375/240.19, 240.11; 382/248; 708/203, 400, 401; 709/247; H04N 7/30

(56) References Cited

U.S. PATENT DOCUMENTS

| | | | |
|---|---|---|---|
| 5,315,670 A | 5/1994 | Shapiro | 382/240 |
| 5,321,776 A | 6/1994 | Shapiro | 375/240.01 |
| 5,412,741 A | 5/1995 | Shapiro | 375/240.11 |
| 5,420,636 A | 5/1995 | Kojima | 348/403.1 |
| 5,477,272 A | * 12/1995 | Zhang et al. | 375/240.06 |
| 5,561,464 A | 10/1996 | Park | 375/240.1 |
| 5,563,960 A | 10/1996 | Shapiro | 375/240.11 |
| 5,706,220 A | 1/1998 | Vafai et al. | 708/308 |
| 5,737,448 A | 4/1998 | Gardos | 382/240 |
| 5,757,974 A | 5/1998 | Impagliazzo et al. | 382/248 |
| 5,798,794 A | 8/1998 | Takahashi | 375/240.11 |
| 5,825,935 A | 10/1998 | Murakoshi | 375/240.11 |
| 5,838,377 A | 11/1998 | Greene | 375/240.11 |

OTHER PUBLICATIONS

"An Embedded Hierarchial Image Coder Using Zerotrees of Wavelet Coefficients", Jerome M. Shapiro, The David Sarnoff Research Center, A Subsidiary of SRI International, Princeton, New Jersey, 08543–5300 (1993).

* cited by examiner

Primary Examiner—Howard Britton
(74) Attorney, Agent, or Firm—Banner & Witcoff, Ltd.

(57) ABSTRACT

Data elements, preferably representative of video data, are logically divided into blocks. In a bit-wise fashion, each block is inspected to determine whether the data elements for that block may be represented in a highly compact format. If a given block may not be represented in this manner, it is sub-divided into blocks having smaller dimensions. This process of identifying suitable blocks and sub-dividing is recursively repeated until minimum block dimensions are reached. The same result may be achieved through the use of a plurality of ascending tables that are constructed by repetitively forming tables of reduced data elements. The plurality of ascending tables is traversed and, based on the reduced data elements, blocks of data are identified that are susceptible to the highly compact format. Wavelet transforms are preferably used to provide video data to be compressed.

30 Claims, 10 Drawing Sheets

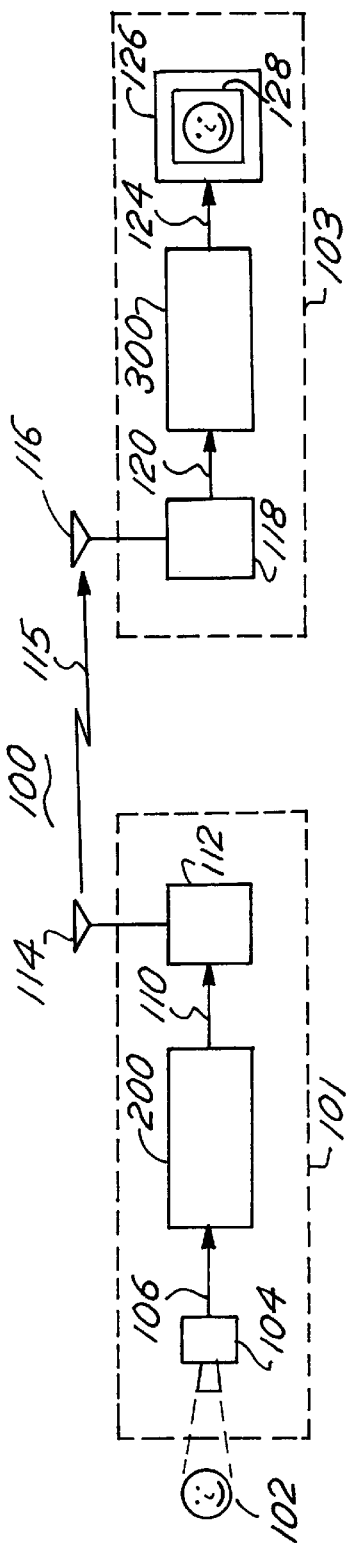
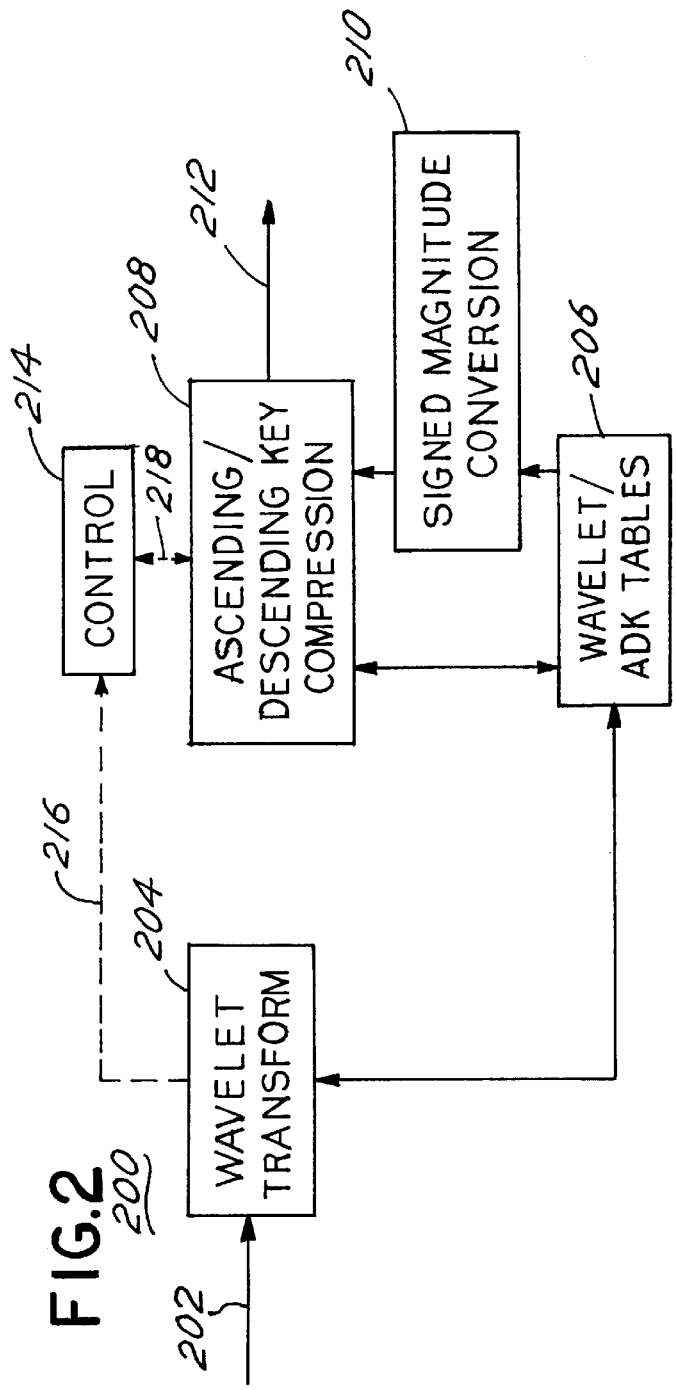
FIG.1
FIG.2

FIG.10C

| A 1 | B 1 |
|---|---|
| C 1 | D 1 |

| AA 1 | AB 0 | BA 1 | BB 0 |
|---|---|---|---|
| AC 0 | AD 1 | BC 0 | BD 1 |
| CA 0 | CB 1 | DA 1 | DB 0 |
| CC 0 | CD 1 | DC 1 | DD 0 |

| AAA 0 | AAB 1 | ABA 0 | ABB 0 | BAA 1 | BAB 0 | BBA 0 | BBB 0 |
|---|---|---|---|---|---|---|---|
| AAC 1 | AAD 0 | ABC 0 | ABD 0 | BAC 0 | BAD 0 | BBC 0 | BBD 0 |
| ACA 0 | ACB 0 | ADA 1 | ADB 0 | BCA 0 | BCB 0 | BDA 0 | BDB 1 |
| ACC 0 | ACD 0 | ADC 1 | ADD 0 | BCC 0 | BCD 0 | BDC 0 | BDD 0 |
| CAA 0 | CAB 0 | CBA 1 | CBB 0 | DAA 0 | DAB 0 | DBA 0 | DBB 0 |
| CAC 0 | CAD 0 | CBC 0 | CBD 0 | DAC 1 | DAD 0 | DBC 0 | DBD 0 |
| CCA 0 | CCB 0 | CDA 1 | CDB 0 | DCA 1 | DCB 0 | DDA 0 | DDB 0 |
| CCC 0 | CCD 0 | CDC 1 | CDD 0 | DCC 1 | DCD 0 | DDC 0 | DDD 0 |

(1002)

VIDEO COMPRESSION SCHEME USING WAVELETS

TECHNICAL FIELD OF THE INVENTION

This invention relates to video compression devices and methods and, in particular, to a method and apparatus for significantly compressing video image information in a digital format without significantly degrading image quality while providing a substantially constant data output rate.

BACKGROUND OF THE INVENTION

Video images are comprised of numerous individual picture elements, typically referred to as pixels. The pixels of a video image are tiny color, and/or black and white dots, closely spaced on an electronic display device such that when the aggregate of the pixels is viewed from a distance they are virtually indistinguishable from each other and appear instead to be an image. For example, full-resolution NTSC (National Television Systems Committee) frames are comprised of thousands of pixels. The pixels forming an NTSC video frame can be represented by binary data values that numerically specify the luma (Y) and chroma red ($C_r$) and chroma blue ($C_b$) content of the image. A full resolution NTSC video frame generally comprises 720 by 480 bytes of digital data for the luma content of such an image. The chroma red and the chroma blue content of an NTSC frame each comprise 360 by 480 bytes of data. At a frame rate of 30 frames-per-second (fps), a wirelessly transmitted real-time NTSC video signal requires a substantial amount (approximately 166 Mbits/sec.) of data to be transferred between a transmitter and receiver.

It is well known that video data is preferably compressed in order to minimize the bandwidth required to transmit the video data. This is typically accomplished by disposing of data that has little or no perceivable information content with respect to an image or images being transferred. One class of methods for compressing video data incorporates the use of wavelet transforms. For example, U.S. Pat. Nos. 5,315,670, 5,412,741, 5,321,776, 5,315,670 and 5,563,960, issued to Shapiro, describe various techniques of video compression based on wavelet transforms. Briefly, a wavelet transform of video data, resulting in wavelet coefficients, provides a method for encoding and decoding video images based upon a conversion of video pixel information into a wavelet domain in which frequency and spatial characteristics are maintained. Additionally, Shapiro recognizes the benefits of compression schemes that provide an embedded stream as output. An embedded stream comprises all lower data rates at the beginning of the stream. That is, as the compression scheme compresses data, that data comprising the greatest or most significant informational content is output first. As the compression continues, additional information content is added to the output stream, further refining the overall quality of the compressed video data. This allows the compression encoder to stop encoding when any target data rate for the output stream has been reached, thereby allowing for a constant output data rate. Similarly, a compression decoder that is decompressing the output stream can stop decoding at any point, resulting in an image having quality that would have been produced at the data rate of the truncated stream. These qualities of embedded streams can simplify overall system design.

While Shapiro (see above) and others have disclosed wavelet transform techniques for compressing video data, many of these prior art techniques have not stressed video transmission speed. Rather, many prior art techniques stress reproduction accuracy, and all such prior art techniques have been computationally complex requiring a significant amount of processing power. As a result, these prior art compression schemes are not typically suitable for use in a consumer product, the cost of which must be as low as possible. A computationally efficient video compression technique capable of economical use in consumer applications would be an improvement over the prior art. Furthermore, such a technique should provide an output as an embedded stream.

SUMMARY OF THE INVENTION

Generally, the present invention provides a computationally simple technique for providing compressed video data as an embedded stream. This is achieved by hierarchically recognizing blocks of data that may be logically reduced to highly compact representations. In one embodiment of the present invention, data elements are logically divided into blocks. In a bit-wise fashion, each block is inspected to determine whether the data elements for that block may be represented in a highly compact format. If so, then a single bit representative of the entire block at a given bit position is output. If a given block may not be represented in this manner, it is sub-divided into blocks having smaller dimensions. This process of identifying suitable blocks and sub-dividing is recursively repeated as necessary until minimum block dimensions are reached.

In another embodiment of the present invention, a plurality of ascending tables are constructed by repetitively forming tables of reduced data elements by logically OR'ing individual data elements from lower level tables. In this manner, successively higher level tables are representative of larger blocks of data elements. Recursively descending from a highest level table and in a bit-wise fashion, the plurality of ascending tables are traversed; based on the reduced data elements, blocks of data are identified that are susceptible to the highly compact format.

The present invention beneficially uses wavelet transforms to provide video data that may be advantageously compressed in accordance with the present invention. After initial pixel conditioning, wavelet coefficients are calculated and are expressed as multi-bit binary values. In an embodiment of the present invention, the wavelet coefficients are expressed in signed magnitude format. The wavelet coefficients are stored in a two-dimensional matrix and are hierarchically clustered together by frequency components of the image they represent. The wavelet coefficients are then supplied as input to compression processing, as disclosed herein.

In contrast with other prior art systems, the invention disclosed and claimed herein provides a computationally efficient means by which video data can be highly compressed without unacceptable picture degradation, while still providing the benefits of embedded output streams. Furthermore, although the present invention is specifically described in terms of its application to video data, the principles taught herein may be beneficially applied to many forms of data.

BRIEF DESCRIPTION OF THE DRAWINGS

FIG. 1 is a block diagram of a wireless video transfer system in accordance with the present invention;

FIG. 2 is a block diagram of an apparatus for compressing video data in accordance with the present invention;

FIGS. 10A through 10C illustrate ascending tables constructed in accordance with the method of FIG. 9;

DETAILED DESCRIPTION OF THE INVENTION

Figure 3:
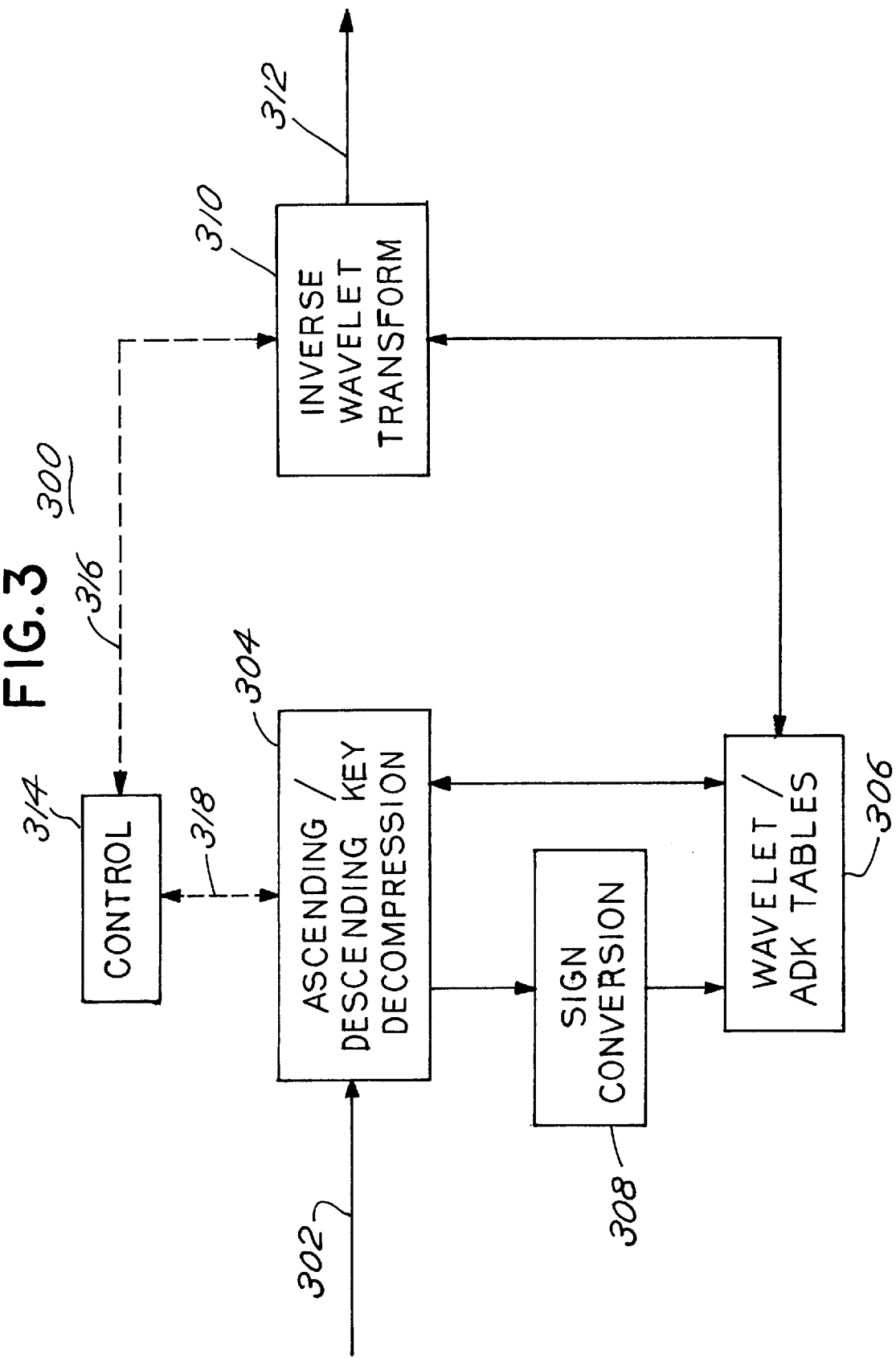
FIG. 3 is a block diagram of an apparatus for decompressing video data in accordance with the present invention.

The present invention may be more fully described with reference to FIGS. 1–12. FIG. 1 shows a block diagram of a wireless video system 100 comprising a video transmitter 101 and a video receiver 103. The video transmitter 101 includes a camera or other image sensor 104 that provides video signals 106 representing the image captured by the image sensor 104, for example, the object identified by reference numeral 102. The video signals 106 may comprise digital or analog signals as a matter of design choice. In a preferred embodiment, the video signals 106 comprise NTSC video signals generated at 30 frames-per-second, although other frame rates may be used. Further, other video signal formats may be used provided that they can be converted to a frame-based, pixel-based format.

The video image sensor 104 transfers the video signals 106 to a video compressor 200, which in turn transforms and compresses the video signals 106 using the techniques described hereinafter. The transformed and compressed information (compressed video) 110 is provided to a wireless transmitter 112, which modulates the compressed video 110 onto a wireless carrier 115 for transmission via an antenna 114. The particular form of wireless carrier or modulation used is not critical to the present invention. It is also recognized that the present invention is not limited to wireless systems. Indeed, the wireless path created by the carrier 115 and associated wireless transmitter 112 and wireless receiver 118 may be replaced by a wired path, or even a combination of wireless and wired conveyance elements, as known in the art.

The video receiver 103 includes a wireless receiver 118 that detects and demodulates the wireless carrier 115 received by an antenna 116. The wireless receiver 118 demodulates the wireless carrier 115 and produces therefrom received compressed video 120. The received compressed video 120 is processed by a video decompressor 300 to generate received video signals 124. The received video signals 124, in turn, are used to provide a video image 128 for display on a display device 126 such as a television or computer monitor. The displayed image 128 is a copy of the image of the object 102 detected by the camera sensing element 104. The video compressor 200 and the video decompressor 300 are discussed in further detail below, particularly with reference to FIGS. 2 and 3.

FIG. 2 is a block diagram of the video compressor 200 shown in FIG. 1. While virtually any suitably fast microprocessor might function as the video compressor 200, those skilled in the art will appreciate that most digital signal processors (DSPs) are inherently superior to a general purpose microprocessor for computationally complex operations like wavelet transform calculations. Furthermore, it is anticipated that the video compressor 200 can be implemented using programmable logic arrays or other similar hardware embodiments.

Video signals 202, preferably in the form of $YC_rC_b$ pixels, are applied as input to a discrete wavelet transform 204 block. In a preferred embodiment, the video signals are conditioned (not shown in FIG. 2) prior to application to the wavelet transform 204. For example, in order to reduce the amount of data to be processed in a video image, every other pixel of a video image is discarded after anti-alias filtering (a process referred to as decimation). At the receiver, upon reconstruction of every other pixel, intervening pixels that were discarded are reconstructed by interpolating the values of the discarded pixels using the retained pixels. Once pixels of the original image are decimated in both the horizontal and vertical planes, the picture information content from the remaining pixels are segregated into luma, chroma red and chroma blue components yielding accordingly three different sets of pixels. In such an embodiment, the input to the wavelet transform 204 comprises 360×240 bytes of luma information and 180×120 bytes for each of the chroma images.

The wavelet transform 204 is calculated for all three of the signal images, i.e., the luma and both the chroma red and chroma blue resulting in the calculation of three sets of wavelet coefficients. The calculation of discrete wavelet transforms are generally well known in the art. In a preferred embodiment, the wavelet transform 204 performs the following steps:

1. The video signal data is "pixel stretched" to increase the size of the image data in order to simplify the division of the data that occurs during the wavelet transform. For example, the 360×240 bytes of luma data are stretched to 384×256 bytes.

2. Each image is passed through the wavelet filter in the Y dimension, splitting the image into a low pass field and a high pass field.

3. These fields are then passed through the wavelet filter in the X dimension, further splitting the fields into low pass and high pass fields, effectively resulting in four fields.

4. That field that has been low pass filtered in both the X and Y dimensions is again processed in accordance with (1) through (3), thereby dividing that field into four new fields.

5. This process is repeated until six levels of luma information have been created and five levels each of chroma red and chroma blue information have been created. Of course, a greater or lesser number of levels may be created for the luma and/or chroma information.

Figure 4:
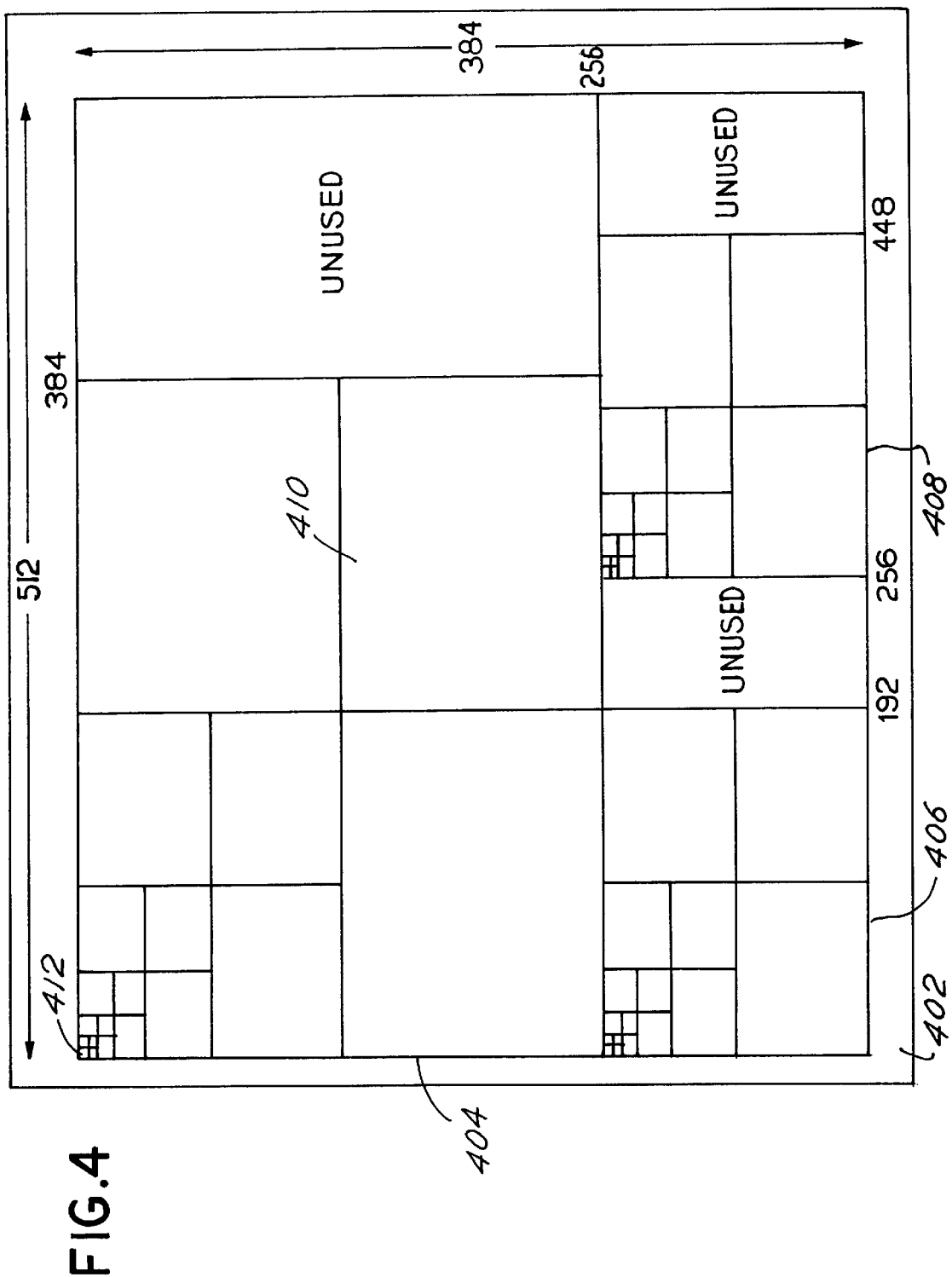
FIG. 4 illustrates a multiple level subband decomposition in accordance with the present invention.

The overall effect of the above-described wavelet transform is a multiple level subband decomposition as illustrated in FIG. 4. Stored in an input storage area 206, the data comprises a wavelet-filtered luma block 404, wavelet-filtered chroma blue block 406 and wavelet-filtered chroma red block 408. The dimensions displayed along the vertical and horizontal axes of FIG. 4 are exemplary only; other dimensions could be used and are a matter of design choice. Furthermore, although the input storage area 206 is represented in two dimensions to aid understanding, in practice it comprises a table stored in memory, as known in the art. Each block 404, 406, 408 comprises a multiple level subband decomposition of the spatial frequency content of the various components of the original image. Subbands representing the lowest frequencies are stored in the upper left hand corners of each block, and subbands representing the highest frequencies are stored in the lower right hand blocks. As known in the art, most information content of a given image is contained in the lower frequencies (e.g., areas of smooth transitions and/or continuous colors), whereas higher frequency data (sharp edges of demarcation between objects) contributes to finer details found in the image. As a result, those coefficients stored in the lower frequency blocks tend to have the highest values. For example, the subband identified by reference numeral 412 in the extreme upper left hand corner of the luma block 404 is representative of the lowest frequency content of the transformed image. Conversely, the subband identified by reference numeral 410 in the extreme lower right hand corner of the luma block 404 is representative of the highest frequency content of the transformed image. The hierarchical nature of the multilevel subband decomposition shown is favored for use in the present invention because it is useful for producing embedded streams.

Referring again to FIG. 2, the wavelet transform 204 creates wavelet coefficients and stores them, as described above, in the input storage area 206. Once the wavelet coefficients are stored, the ascending/descending key (ADK) compressor 208 can commence compression processing to provide compressed data 212. In practice, sequencing of the wavelet transform 204 and ADK compressor 208 processing is supervised by a control function 214 that transceives control signals 216, 218 with the respective functions. In a preferred embodiment, the control function 214 maintains processing on a frame-by-frame basis. For example, the wavelet filter 204 informs the control function 214 when it has completed processing of the video data 202 (one frame) and created new wavelet coefficients in the input storage area 206. In response, the control function 214 informs the ADK compressor 208 that it can begin processing the newly stored wavelet coefficients. It is anticipated that the control function 214 may also provide the ADK compressor 208 with frame size data that is used to inform that ADK compressor 208 how much data, on a per frame basis, it should output, as discussed in further detail below. Once the ADK compressor 208 has completed its processing, it informs the control function 214 which, in turn, informs the wavelet filter 204 that it can begin processing a new frame of video data.

Figure 5:
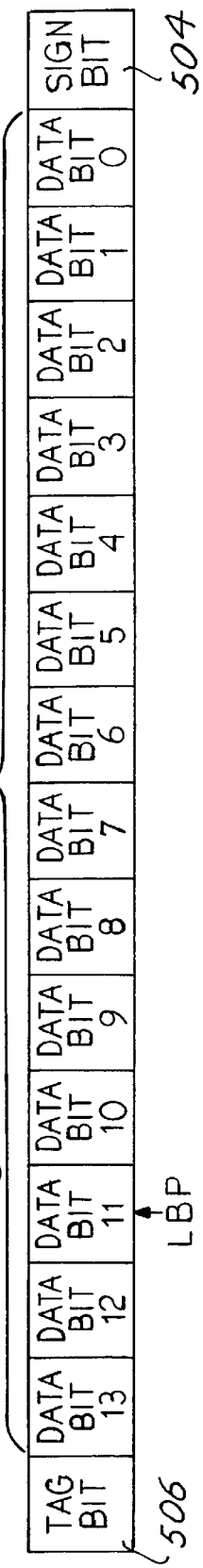
FIG. 5 illustrates a data representation format in accordance with the present invention.

The video compressor 200 also comprises a signed magnitude converter 210. In practice, the wavelet coefficients are stored in the input storage area 206 using a data representation that is most conducive to simple math operations, e.g., a one's complement or two's complement data representation. However, as will become evident from the description below, the ADK compressor 208 operates most efficiently when the number of occurrences of binary "1" digits in the data to be compressed is minimized. To this end, the signed magnitude converter 210, in conjunction with the ADK compressor 208, converts the data stored in the input storage area 206 into a signed magnitude format, as illustrated in FIG. 5. FIG. 5 illustrates a preferred data representation comprising an N-bit magnitude representation 502, a sign bit 504 and a tag bit 506. In the example shown, N=14. Because the actual data is represented as a magnitude, the likelihood that the most significant bits will be binary "0" digits is maximized. As known in the art, the sign bit 504 represents whether the overall value is positive or negative. Although shown in a least significant bit position, the sign bit 504 may occupy any bit position as dictated by design considerations. Likewise, the tag bit 506 may occupy any bit position as a matter of design choice. Use of the tag bit 506 will be described in greater detail below, particularly with reference to FIGS. 6 and 11.

FIG. 3 is a block diagram of the video decompressor 300 shown in FIG. 1. While virtually any suitably fast microprocessor might function as the video decompressor 300, those skilled in the art will appreciate that most digital signal processors (DSPs) are inherently superior to a general purpose microprocessor for computationally complex operations like inverse wavelet transform calculations. Furthermore, it is anticipated that the video decompressor 300 can be implemented using programmable logic arrays or other similar hardware embodiments. Generally speaking, the video decompressor 300 performs operations complementary to the video compressor 200 to provide a reproduction of the originally-input video signals.

The video decompressor 300 receives compressed data 302 as provided by a video compressor in accordance with the present invention. The compressed data 302 is routed to an ADK decompressor 304. As described in further detail below, the ADK decompressor 304 first recreates the wavelet coefficients in the signed magnitude format and stores them in an output storage area 306. Furthermore, in conjunction with the signed magnitude converter 308, the ADK decompressor 304 causes the received wavelet coefficients to be converted into a data representation more suitable for use in the inverse wavelet transformation process, e.g., a one's complement or two's complement data representation. This done, an inverse wavelet transform 310 operates on the received wavelet coefficients to provide uncompressed data 312. Techniques for inverse wavelet transformation are well known in the art. In a manner similar to the video compressor 200, the video decompressor 300 comprises a control function 314 that transceives control signals 316, 318 to sequence operations between the ADK decompressor 304 and the inverse wavelet transform 310. That is, the ADK decompressor 304 informs the control function 314 when it has completed decompressing a frame's worth of data and, in response, the control function 314 informs the inverse wavelet transform 310 that it can begin its processing. When the inverse wavelet transform 314 completes its operations, it informs the control function 314 that, in turn, informs the ADK decompressor that it can once again provide more decompressed data. Various embodiments of the ADK compressor and decompressor are described below with reference to FIGS. 6–12.

Figure 6:
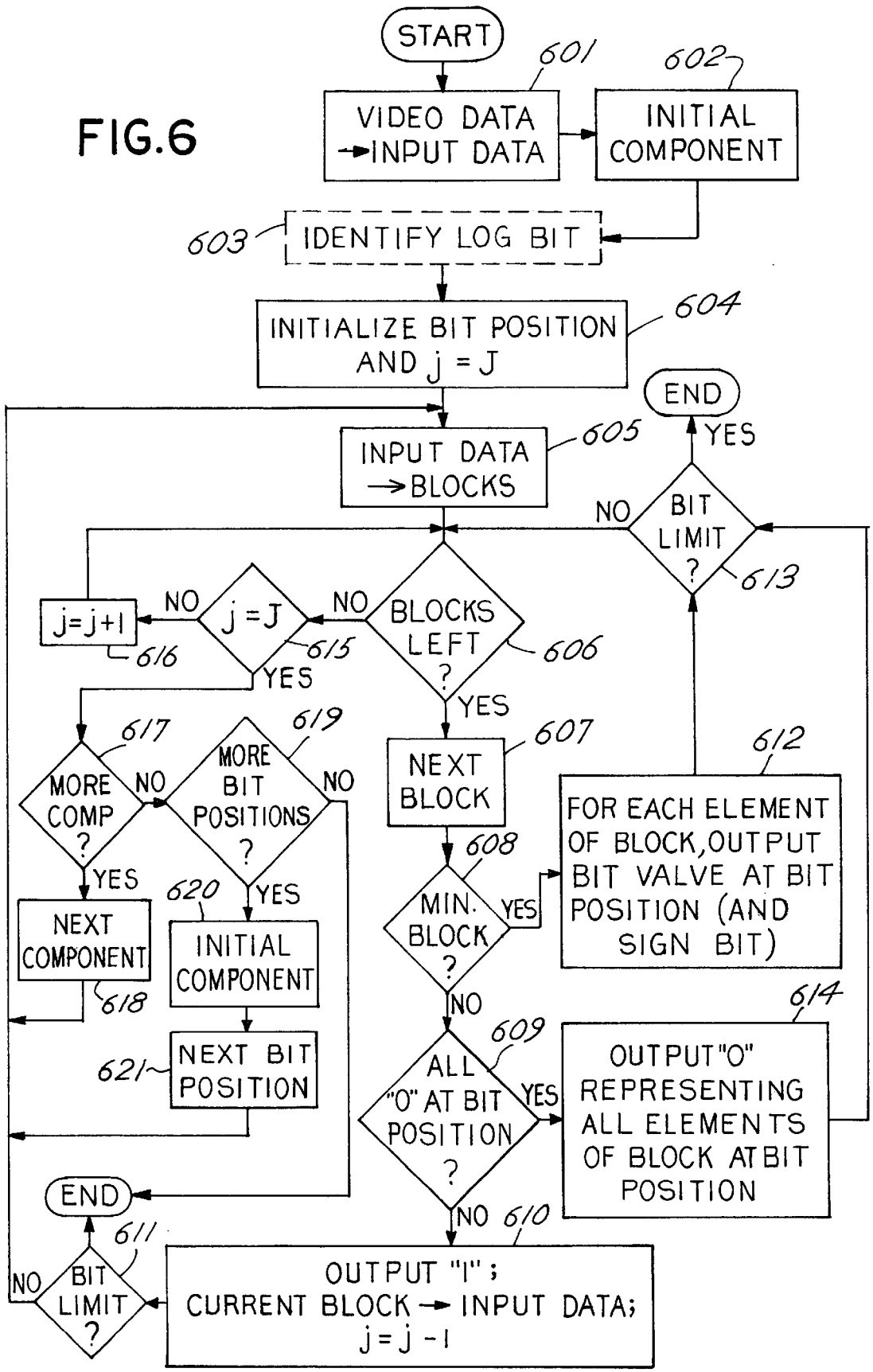
FIG. 6 is a flow chart illustrating a first method for providing compressed video data in accordance with the present invention.

FIG. 6 is a flowchart illustrating a first method for providing compressed data. The steps illustrated in FIG. 6 can be implemented by the video compressor 200 described above, in particular the ADK compressor 208. At step 601, video data comprising a plurality of elements is provided as input data. In a preferred embodiment, the video data comprises wavelet coefficients (for each of the luma, chroma red and chroma blue components of a video frame) resulting from a multiple subband decomposition described above; each wavelet coefficient is considered a distinct element of the input data. Of course, the input data may comprise data types other than wavelet coefficients. At step 602, the data elements corresponding to any one of the components are accessed as the initial component to be analyzed. In a preferred embodiment, the luma component is the initial component.

At step 603, a log bit position is optionally identified for each of the Y, $C_r$ and $C_b$ components. Referring again to FIG. 5, the N-bit magnitude data 502 may be thought of as occupying a plurality of bit positions (excluding the sign bit 504 and tag bit 506). As illustrated in FIG. 5, the data 502 comprises 14 different bit positions, from a most significant bit position (labeled "Data bit 13") to a least significant bit position (labeled "Data bit 0"). In the context of the present invention, the log bit position for a given component is that bit position corresponding to a most significant bit (i.e., having a binary "1" value) of an element having the maximum magnitude. Thus, in order to determine the log bit position of, say, the luma data, the luma data is searched to find the maximum magnitude value. Assume, for example, that the maximum magnitude value of all of the luma data (further assuming N-bit magnitudes where N=14) is "00110111010010". In this example, the log bit position for the luma data would be the bit position labeled "Data bit 11", as shown in FIG. 5 with the arrow labeled "LBP". This process would then be repeated for the chroma red and chroma blue to provide three log bit positions. In the preferred embodiment, the maximum of these three log bit positions is then provided as output of the compression process, although each may be provided as output.

As described in further detail below, the present invention provides compression by locating the largest possible blocks of data elements having a binary "0" values in a given bit position. Such blocks of data at the given bit position are then compactly represented by a single bit in the output data stream. Binary "1" values found in the data at a given bit position must be sent separately. Thus, the log bit position represents a starting point in searching for binary "1" values in the data being compressed; for all data elements, all bit values at bit positions greater than the log bit position are known to comprise binary "0" values, so it becomes unnecessary to transmit them. This may be better understood by way of an example.

Figure 7:
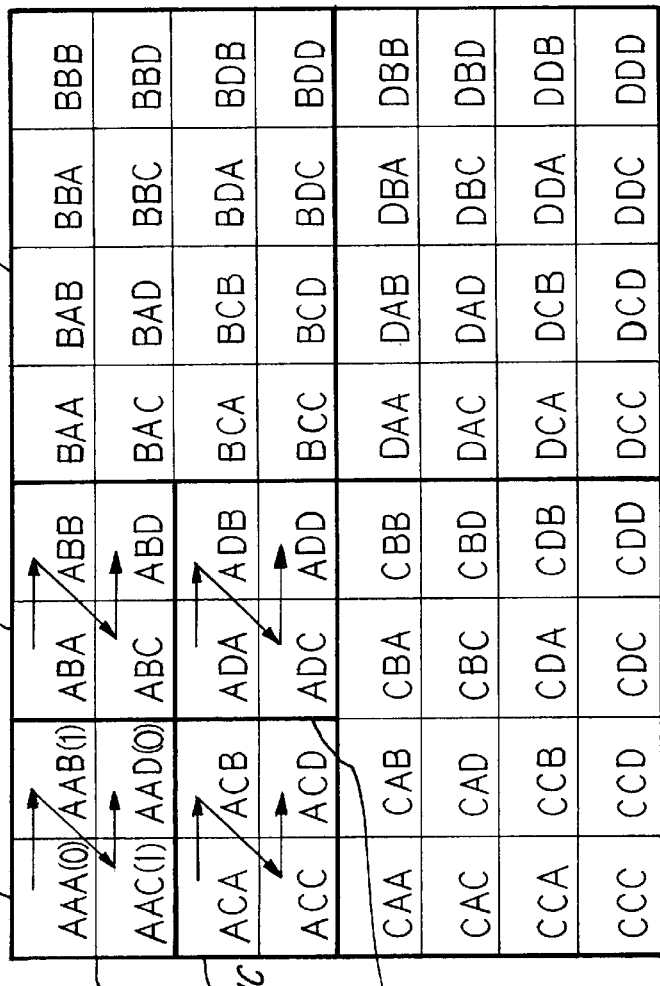
FIG. 7 illustrates exemplary video data being analyzed in accordance with the method of FIG. 6.

Referring to FIG. 7, there is a block 704A illustrated comprising data elements labeled as "AAx", where x can be any of "A", "B", "C" or "D". For simplicity, it is assumed that each data element comprises a 3-bit magnitude value with the most significant bit position at the leftmost bit position (bit position 2) and the least significant bit position at the rightmost bit position (bit position 0), with only one bit position between (bit position 1). Further assume the following values for each of the data elements: "AAA" is "010", "AAB" is "001", "AAC" is "011" and "AAD" is "000". Obviously, the maximum magnitude of these values is "011", with the most significant bit of this value having a binary "1" value occurring at bit position 1. Hence, bit position 1 is identified as the log bit position. Because all of the bits at higher bit positions (i.e., bit position 2) have binary "0" values, there is no need to transmit them. When a receiver receives the log bit position, it will automatically assume that, for all data elements (limited in this example to the "AAx" elements), the bit value at bit positions higher than the log bit is "0". In this example, use of the log bit position eliminated the need to transmit four bit values. Of course, this same concept can be applied to data representations comprising many more bit positions and thereby provide even greater transmission efficiencies, when possible.

Returning again to FIG. 6, an analysis bit position is initialized at step 604. When a log bit position has been determined, the analysis bit position is preferably initialized to the log bit position value, although the analysis bit position could be initialized to any bit position. Regardless, as those having ordinary skill in the art will recognize, the production of embedded streams is facilitated by initializing the analysis bit position to a bit position of higher significance and decrementing the analysis bit position to bit positions of lower significance as the analysis procedure continues. Also shown at step 604, a recursion indicator, j, is initialized to its maximum value J. The recursion indicator described herein is used for illustration purposes only; as those having ordinary skill in the art will recognize, many techniques exist for implementing recursive procedures. In the implementation illustrated in FIG. 6, the value of the recursion indicator at any given time is indicative of the size blocks currently under consideration; the maximum value J indicates that the largest possible blocks are being considered, while progressively smaller values correspond to progressively smaller block dimensions.

At step 605, the input data (at this point, all of the video data) is logically subdivided into blocks. The manner in which the input data is logically subdivided is a matter of design choice although, in a preferred embodiment, the input data is subdivided into four equally sized blocks. For example, referring again to FIG. 7, there is shown video data 700 that has been divided into separate blocks 702A–D. In the example shown, a first block 702A comprises sixteen data elements labeled "Axy", where both x and y can be any of "A", "B", "C" or "D". A similar convention applies to blocks 702B–D. At step 606, it is determined whether there are any blocks remaining to be processed. At this point in the example illustrated in FIG. 7, there are blocks remaining to be processed and, at step 607, the next available block to be processed is selected, e.g., the first block 702A.

At step 608, it is determined whether the block currently under consideration has minimum block dimensions. In a preferred embodiment, the minimum block dimensions correspond to 12×8 blocks, i.e., blocks comprising 96 data elements. Once minimum block dimensions have been reached, no further effort to subdivide the blocks for compact representation is made. In effect, the minimum block dimensions are indicative of the "deepest" level of recursion available, as will be evident from the discussion below. If the block currently under consideration does have the minimum block dimensions, processing continues at step 612.

At step 612, the minimum-dimension block currently under consideration is preferably subdivided into a plurality of M×M, non-overlapping blocks, where M=2. Where the minimum block dimensions are 12×8, this will result in twenty-four 2×2 blocks. Other values of M could also be used, and it is further understood that the blocks established at step 612 need not be square. Regardless, each sub-block within the minimum-dimensioned block is then analyzed. That is, for each sub-block, the bit value at the analysis bit position of each data element is determined and treated in accordance with the following steps:

1) When a "0" bit value is encountered, output a "0" and go to the next data element;
2) When a "1" is encountered, output a "1" and check the tag bit associated with that data element. If the tag bit for that data element is set, then the sign bit for that data element has already been output and processing can continue at the next data element. If the tag bit is not set, output the sign bit for that data element, set the tag bit and go to the next element. (This process assumes that the tag bits are initially cleared. The polarity of the tag bits could just as easily be reversed to achieve the same function, in which case the tag bits would initially be set.)

This process is repeated until the bit values at the bit position of each data element in the respective sub-blocks have been output. The tag bits for a given data element ensures that the sign bit for that element is output when the first "1" bit value for that data element is output, and it ensures that the sign bit for that element only gets sent once. The particular pattern used to traverse the elements in each sub-block is a matter of design choice. One example is illustrated in FIG. 7. Assume that the first block 702A comprises the minimum block dimensions. In this case, the sub-blocks 704A–D are analyzed (as described above) using "z" patterns both between the sub-blocks and within the sub-blocks (as indicated by the arrows) themselves. Thus, processing of individual data elements would proceed as follows: "AAA", "AAB", "AAC", "AAD", "ABA", "ABB", "ABC", "ABD", "ACA", "ACB", "ACC", "ACD", "ADA", "ADB", "ADC" and "ADD". Of course, other patterns between and/or within the sub-blocks could be just as easily used. Processing then continues at step 613 where it is determined whether the bit limit for the current video frame has been reached yet. Because the output provided is an embedded stream (by virtue of decrementing the analysis bit position, and the order of traversal of the elements in the structure), processing can be discontinued at any point, i.e., when a predetermined number of bits allocated to compressed video data output has been reached. If the bit limit has not been reached yet, processing of additional blocks at the j'th level continues at step 606.

If, at step 608, the block under consideration does not have the minimum block dimensions, processing continues at step 609. At step 609, it is determined whether each data element of the current block comprises a first bit value at the analysis bit position. (In a preferred embodiment, as illustrated in FIG. 6, the first bit value is a "0" bit value, whereas a second bit value is a "1" bit value.) If so, then the first bit value (i.e., a "0" bit) is output, at step 614, as representative of all of the data elements at the analysis bit position of the block currently under consideration. For example, assume that each data element within the first block 702A (i.e., elements "Axy" where both x and y can be any of "A", "B", "C" or "D") comprises a "0" bit at the current analysis bit position. A single "0" bit is then provided as output representative of all of those data elements at the analysis bit position. Processing then continues at step 613 where it is again determined whether the bit limit for the current video frame has been reached yet. If not, processing continues at step 606.

If, however, at step 609 it is determined that any data element of the current block comprises the second bit value (i.e., a "1" bit") at the analysis bit position, then the second bit value is output at step 610. The second bit value output at this point will indicate to a receiving entity that a recursion has occurred and that processing will continue on a smaller block size basis. To this end, also at step 610, the current block (e.g., first block 702A) is designated the input block (in anticipation of further subdivision at step 605), and the recursion indicator, j, is decremented, indicating that at least one level of recursion has occurred. If, at step 611, the output bit limit for the current frame being analyzed has not been exceeded, processing continues at step 605. At step 605, the input data (now the first block 702A) is again logically divided into blocks as shown in, for example, FIG. 7 resulting in blocks labeled 704A–D. Note that at this point, the larger blocks at the highest level (i.e., blocks 702B–D) have not yet been processed. Processing at the new level then proceeds in accordance with steps 606–614 described above.

Steps 606 and 615, in conjunction, determine when a given level of recursion has been completed, indicating that either that: (i) processing for the entire frame has completed or, (ii) the process must return to the next highest recursion level (i.e., next largest block size) to continue processing. For example, assume that j<J currently, that the blocks labeled 704A–D are currently being processed, and that the block labeled 704D has just completed processing in accordance with either step 612 or step 614. At step 606, there will be no more blocks at this level left to process, so step 615 will determine that the process has not completed the highest recursion level yet because j≠J. At step 616, the recursion indicator is incremented and, at step 606 it is determined whether there are any additional blocks at the new j'th level remaining to be processed. Thus, when the block labeled 704D has completed, the recursion indicator will be incremented to the next highest level. At this level, the blocks labeled 702B–D would still need to be processed and the entire procedure would be repeated.

When the compression of all data elements at the current analysis bit position has been performed for the component currently being analyzed (i.e., the "Yes" branch out of step 615), the process will continue at step 617. At step 617, it is determined whether more components remain to be analyzed at the current analysis bit position. In a preferred embodiment, the luma component is analyzed first at the first analysis bit position, followed by each of the chroma components at the first bit position. This order is repeated for subsequent bit positions until the bit limit is met or all components have been processed at all bit positions. If more components remain to be analyzed at the current analysis bit position, then the data elements corresponding to the next component are accessed at step 618, and processing returns to step 605 for analysis of the new component at the current analysis bit position.

If, however, no more components remain to be analyzed at the current analysis bit position, processing continues at step 619 where it is determined whether any more bit positions remain to be analyzed. If not, then all components have been analyzed at all possible bit positions and processing for the frame is concluded. (Note that if all components have been analyzed at all bit positions before the bit limit has been reached, the remaining bit budget up to the bit limit can be stuffed with dummy data bits in order to preserve bit boundaries.) If, however, additional bit positions remain to be analyzed, the data elements corresponding to the initial component (i.e., the same component as selected at step 602) are accessed at step 620. At step 621, the next bit position is designated as the analysis bit position. In a preferred embodiment, step 621 comprises a step of decrementing the analysis bit position to the next most significant bit position. Processing may then resume at step 605.

Figure 8:
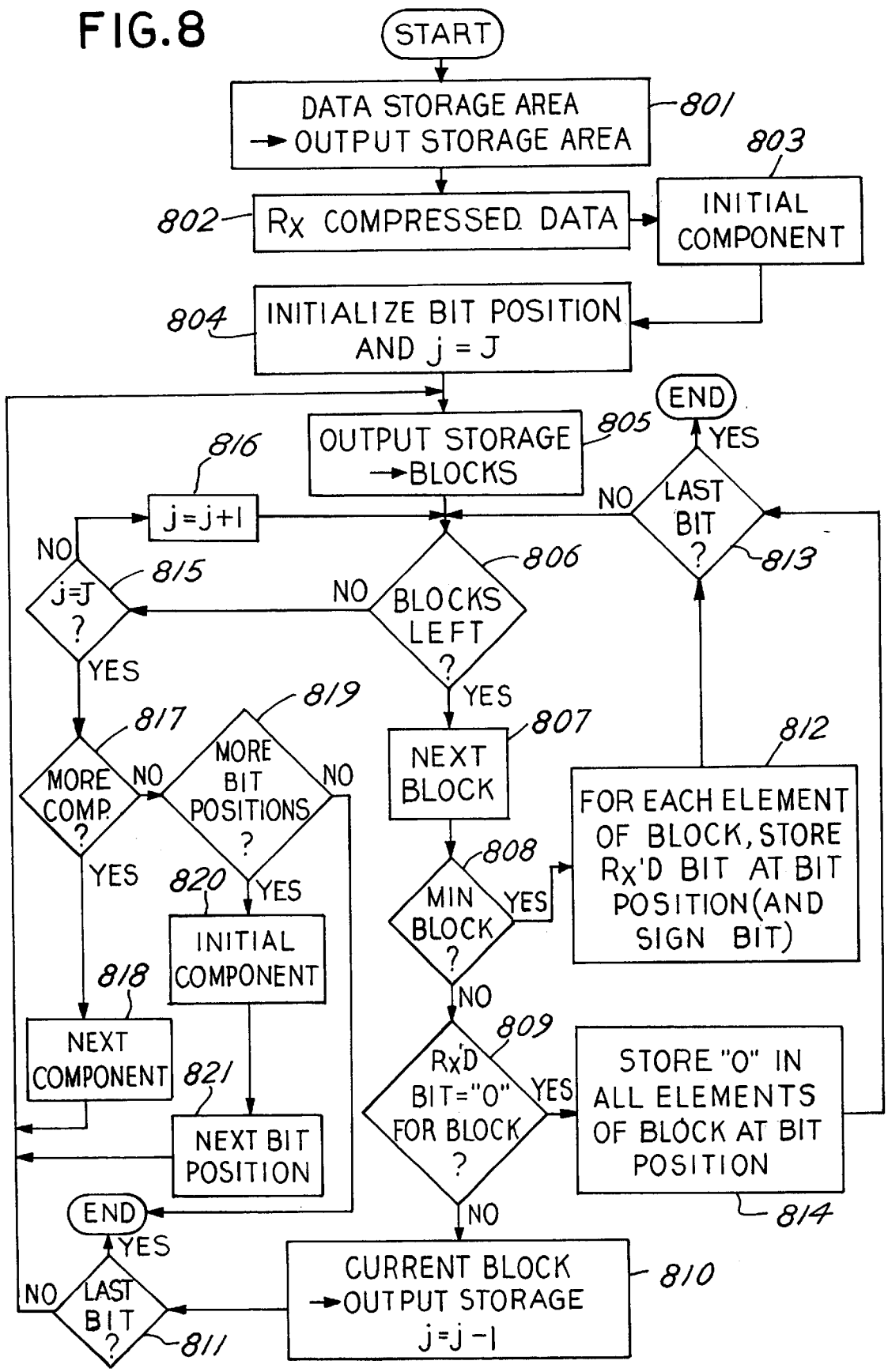
FIG. 8 is a flow chart illustrating a first method for providing decompressed video data in accordance with the present invention.

FIG. 8 is a flow chart illustrating a first method for providing decompressed video data. The steps illustrated in FIG. 8 can be implemented by the video decompressor 300 described above, in particular the ADK decompressor 304. The method illustrated in FIG. 8 is complementary to the method described above relative to FIG. 6. At step 801, a data storage area suitable for storing at least one frame's worth of decompressed video data is designated as an output storage area. In a preferred embodiment, the decompressed video data comprises wavelet coefficients resulting from multiple subband decomposition of luma, chroma red and chroma blue video components, with each wavelet coefficient considered an individual data element. At step 802, compressed data, such as that provided by the method illustrated in FIG. 6, is received. In a preferred embodiment, the compressed data comprises compressed video data and includes data representative of a log bit position as described above. At step 803, that portion of the output storage area for storing decompressed data corresponding to any one of the components (Y, $C_r$, $C_b$) is accessed as the initial component to be synthesized. In a preferred embodiment, the luma component is the initial component.

At step 804, a synthesis bit position is initialized. Where a log bit position has been provided, the synthesis bit position is initialized to the same value as the log bit position, although any bit position value could be used so long as it identically tracks the progression of the analysis bit position described above relative to FIG. 6. Also at step 804, a recursion indicator, j, is initialized to its maximum J. Similar to the recursion indicator described above with reference to FIG. 6, the recursion indicator of FIG. 8 is but one of many methods available for implementing recursive procedures and is described here for illustrative purposes only.

At step 805, the output storage area is logically subdivided into blocks. In particular, the block structure created in this step is preferably identical in spatial orientation and dimensions to the block structure resulting from the first iteration of step 605 discussed above. In this manner, the decompressed video data resulting from the process of FIG. 8 should be identical to the video data originally compressed (assuming no uncorrectable errors were incurred in the compressed video data during transmission). During the process of decompressing the video data, the same spatial patterns used to analyze the video data are followed when decompressing the compressed data.

At step 806, it is determined whether there are any blocks left to be processed (i.e., to receive reconstructed/decompressed video data) at the current level. Since the first pass through the process of FIG. 8 is at the J'th level, the blocks to be processed will correspond to the largest possible block size. At step 807, the next available block (for the first iteration, this would be the first available block) is selected and, at step 808, it is determined whether the selected block comprises a minimum dimension block. As noted above, minimum dimension blocks correspond to the deepest level of recursion. If the currently selected block is not a minimum dimension block, processing continues at step 809.

At step 809, a bit of the received compressed data, corresponding to the block under consideration, is analyzed to determine its bit value. If the bit comprises a first bit value (preferably a "0" bit value), processing continues at step 814 where a bit having the first bit value is stored, at the synthesis bit position, in each data element forming the currently selected block. In this manner, the present invention can provide a very compact representation for a significant amount of data, particularly where the block size is relatively large. Then, at step 813, it is optionally determined whether the bit limit for the current video frame has been reached yet. As noted above, the compression process can be discontinued at any point when a predetermined number of bits allocated to compressed video data output has been reached. Likewise, the decompression process can be discontinued after a predetermined number of received compressed video bits have been processed. This is again the result of the embedded stream nature of the compressed video data. If the bit limit has not been reached yet, processing of additional blocks at the j'th level continues at step 806.

If, however, the bit analyzed at step 809 comprises a second bit value (preferably a "1" bit value), processing continues at step 810 where the currently selected block is designated as the output storage area and the recursion indicator, j, is decremented. In essence, the received bit corresponding to the currently selected block and having the second bit value acts as a flag indicating that at least one data element comprises the second bit value (at the synthesis bit position), and that further synthesis should proceed on a basis of smaller blocks within the currently selected block. If, at step 811, the bit limit for the current frame being synthesized has not been exceeded, processing continues at step 805. At step 805, the output storage area (now the block considered during the previous pass through steps 806 et seq.) is again logically divided into blocks. Note that at this point, the larger blocks at the highest level (i.e., the previous level) have not yet been completely processed. Processing at the new level then proceeds in accordance with steps 806 et seq.

As the process of recursion continues, a point will be reached where the resulting blocks under consideration will have the minimum block dimensions, as determined at step 808. When this occurs, processing at step 812 is effectively the inverse of that described above relative to step 612. At step 812, the minimum-dimension block currently under consideration is preferably subdivided into a plurality of M×M blocks, where M=2. Once again, where the minimum block dimensions are 12×8, this will result in twenty-four 2×2 blocks. Other values of M could also be used, and it is further understood that the blocks established at step 612 need not be square. Regardless, bit values at the synthesis bit position for each data element of each sub-block within the minimum-dimensioned block are then synthesized. That is, for each sub-block, the bit value at the synthesis bit position of each data element is determined based on received bits from the compressed video data in accordance with the following steps:

1) When a "0" bit value is encountered, store a "0" and go to the next data element;
2) When a "1" is encountered, store a "1" and check the tag bit associated with that data element. If the tag bit for that data element is set, then the sign bit for that data element has already been stored and processing can continue at the next data element. If the tag bit is not set, store the next received bit as the sign bit for that data element, set the tag bit and go to the next element. (This process assumes that the tag bits are initially cleared. The polarity of the tag bits could just as easily be reversed to achieve the same function, in which case the tag bits would initially be set.)

This process is repeated until the bit values at the bit position of each data element in the respective sub-blocks have been stored. The tag bits for a given data element ensures that the sign bit for that element is stored when the first "1" bit value for that data element is stored, and it ensures that the sign bit for that element only gets stored once. The particular pattern used to traverse the elements in each sub-block is a matter of design choice, but in any event should be identical to that used during the analysis/compression process.

Steps 806 and 815, in conjunction, determine when a given level of recursion has been completed, indicating that either that: (i) processing for the entire frame has completed or, (ii) the process must return to the next highest recursion level (i.e., next largest block size) to continue processing. For example, assume that j<J currently, and that the last block at level (j) has just completed processing (for example, in accordance with either step 812 or step 814). At step 806, there will be no more blocks at level (j) left to process, so step 815 will determine that the process has not completed the highest recursion level yet because j≠J. At step 816, the recursion indicator is incremented and, at step 806 it is determined whether there are any additional blocks at the new j'th level remaining to be processed. If there are blocks at the new j'th level to be processed, steps 806–814 are carried out as described above.

When the reconstruction of all data elements at the current synthesis bit position has been performed for the component currently being synthesized (i.e., the "Yes" branch out of step 815), the process will continue at step 817. At step 817, it is determined whether more components remain to be synthesized at the current synthesis bit position. In a preferred embodiment, the luma component is synthesized first at the first synthesis bit position, followed by each of the chroma components at the first bit position. This order is repeated for subsequent bit positions until the bit limit is met or all components have been processed at all bit positions. If more components remain to be synthesized at the current synthesis bit position, then that portion of the output storage area for storage of data elements corresponding to the next component are accessed at step 818. Processing then returns to step 805 for reconstruction of the new component at the current synthesis bit position.

If, however, no more components remain to be synthesized at the current synthesis bit position, processing continues at step 819 where it is determined whether any more bit positions remain to be synthesized. If not, then all components have been synthesized at all possible bit positions and processing for the frame is concluded. (Note that if all components have been synthesized at all bit positions before the bit limit has been reached, the remaining received bits from the compressed data are preferably dummy data bits provided in order to preserve bit boundaries, and can be ignored.) If, however, additional bit positions remain to be synthesized, that portion of the storage area for storage of data elements corresponding to the initial component (i.e., the same component as selected at step 803) is accessed at step 820. Thereafter, at step 821, the next bit position is designated as the synthesis bit position. In a preferred embodiment, step 821 comprises a step of decrementing the synthesis bit position to the next most significant bit position. Processing may then resume at step 805.

Together, the methods described relative to FIGS. 6 and 8 provide an efficient technique for the compression and decompression of data, particularly wavelet coefficients resulting from a hierarchical, multiple subband decomposition. By identifying the largest possible blocks of data that can be compactly represented, the present invention provides good compression ratios with relatively little computational complexity. Yet another embodiment of the present invention is described with reference to FIGS. 9–12 below. In particular, FIGS. 9–12 illustrate a method for ADK compression/decompression based on a plurality of ascending tables. The ascending tables provide increasingly abstract representations of wavelet coefficients such that those portions of data most susceptible to highly compact representation are readily identifiable.

Figure 9:
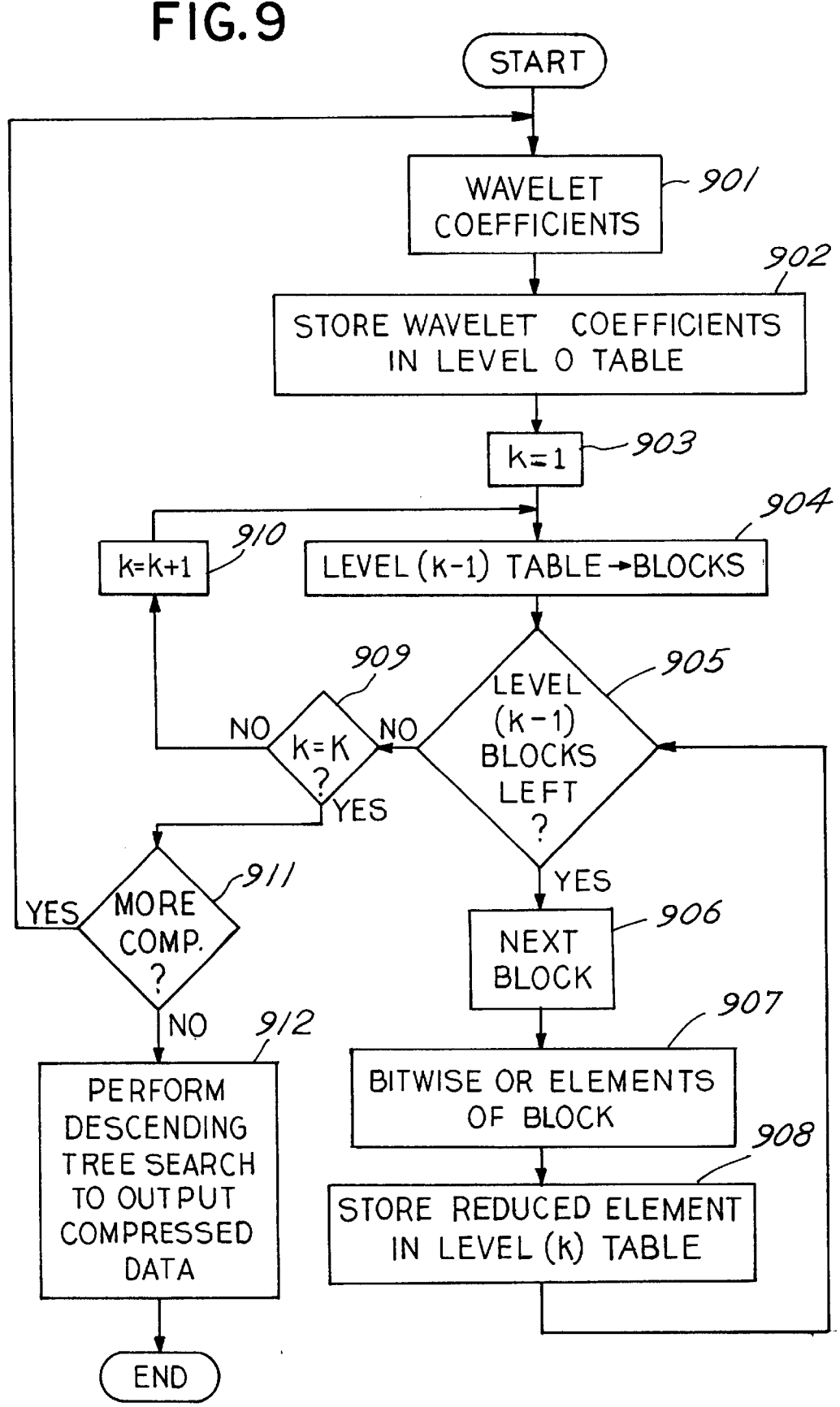
FIG. 9 is a flow chart illustrating a method for constructing ascending tables in accordance with the present invention.

FIG. 9 illustrates a method for constructing the ascending tables. The method illustrated in FIG. 9 can be implemented by the video compressor 200, preferably by the wavelet transform 204 after the wavelet coefficients have been calculated, or by the ADK compressor 208 prior to the actual compression of the wavelet data. Regardless of how it is implemented, the method begins at step 901 where wavelet coefficients are provided as input. Preferably, the wavelet coefficients are provided in a manner similar to that discussed above relative to the wavelet transform 204. As will be apparent from the discussion below, separate ascending tables are created for each of the luma, chroma red and chroma blue components when such are provided as input. The resulting wavelet coefficients (corresponding to one of Y, $C_r$ or $C_b$) are then stored, at step 902, as a level 0 table, preferably in accordance with the arrangement discussed above relative to FIG. 4. Additionally, at step 903, a level index, k, is initialized to one (1). The level index, k, is but one of a number of methods those having ordinary skill in the art will recognize as being useful for the construction of a plurality of ascending tables, as described hereinbelow.

At step 904, the level (k–1) table is subdivided into a plurality of blocks. For the first pass through step 902, the level (k–1) table corresponds to the level 0 table. The manner in which the level (k–1) table is logically subdivided is a matter of design choice. In a preferred embodiment, the level (k–1) table is subdivided into a plurality of M×M, non-overlapping blocks, where M=2. Of course, other block dimensions could be used; it is further anticipated that non-square block dimensions could also be used. At step 905, it is determined whether there are any blocks in the level (k–1) table remaining to be processed. If so, the next available block is selected at step 906. At step 907, the data elements of the currently selected block are bitwise OR'd together to provide a reduced data element. (For purposes of illustration, the OR operation is represented by the "●" symbol.) This process is further illustrated in FIGS. 10A and 10B.

FIG. 10A depicts a plurality of 2×2 blocks each comprising data elements. For the purposes of simplicity, each data element comprises a single bit of data, with values as shown in FIG. 10A. Four 2×2 blocks are indicated by reference numeral 1002. In accordance with step 907, the elements of a first block (comprising data elements labeled "AAx" where x is any one of "A", "B", "C" or "D") are OR'd together resulting in a reduced data element "AA" having a bit value of "1" ("AAA"●"AAB"●"AAC"●"AAD"= 0●1●1●0=1). Data elements "AAA", "AAB", "AAC" and "AAD" are called the "children" of reduced data element "AA". The same procedure is performed on the data elements of a second, third and fourth block (comprising, respectively, data element labeled "ABx", "ACx" and "ADx" where x is any one of "A", "B", "C" or "D") resulting in reduced data elements labeled "AB", "AC" and "AD". In effect, the value of each of the reduced data elements indicates the presence or absence of a "1" bit value in any of its associated children. In practice, each of the data elements will not comprise a single bit value, but rather a predetermined number of bits in accordance, for example, with the data representation illustrated in FIG. 5. In that case, the bit values of the data elements in each of the corresponding bit positions are OR'd together (bitwise OR'd) resulting in a reduced data element of the same length (predetermined number of bits) as its corresponding children. Each reduced data element is stored, at step 908, in a corresponding position in a level (k) table. Steps 905–908 are repeated so long as there are blocks to be processed at the current level (k). Where 2×2 blocks are used in the creation of reduced data elements, the resulting level (k) table is one-half the size (in each dimension) of the level (k–1) table, a illustrated in FIGS. 10A and 10B.

When, at step 905, it is determined that there are no more blocks to be processed in the level (k–1) table, processing continues a step 909 where it is determined whether the table of reduced elements just completed corresponds to the maximum level (K) table. That is, the process illustrated in FIG. 9 will result in K+1 tables for each component (Y, $C_r$ or $C_b$) processed. Table 1 illustrates preferred parameters for the ascending tables constructed in accordance with FIG. 9. As shown in Table 1, preferred values are K=5 for a luma component and K=4 for each of the chroma components. Of course, other values of K may be used as required.

TABLE 1

| Luma Level | Chroma Level | Table Size | Table Dimensions | Number of 2 × 2 Blocks |
|---|---|---|---|---|
| 5 | 4 | 96 | 12 × 8 | 24 |
| 4 | 3 | 384 | 24 × 16 | 96 |
| 3 | 2 | 1536 | 48 × 32 | 384 |
| 2 | 1 | 6144 | 96 × 64 | 1536 |
| 1 | 0 | 24576 | 192 × 128 | 6144 |
| 0 |   | 98304 | 384 × 256 | 24576 |

If the maximum level (K) table has not been produced yet, the level index, k, is incremented at step 910 and processing continues at step 904. Subsequently, steps 904–908 are performed until a table of reduced data elements at the new k'th level has been generated. For example, referring to FIGS. 10B and 10C, the data elements in the 2×2 block identified by reference numeral 1004 are reduced as described above to provide a reduced data element 1006 ("A"). Note that the data elements in the block identified by reference numeral 1004 are children of the reduced data element 1006; the data elements identified by the reference numeral 1002 are descendants of the reduced data element 1006. Those blocks comprising data elements labeled "Bx", "Cx" and "Dx", where x is any of "A", "B", "C" or "D", are similarly processed to provide reduced data elements "B", "C" and "D", respectively, with each having similar children/descendant relationships as described above.

Eventually, for any given component (Y, $C_r$ or $C_b$), the level (K) table of reduced coefficients is completed, as determined at step 909. When this occurs, it is further determined, at step 911, whether any components remain to be processed. If so, processing continues at step 901 as described above. If not, processing continues at step 912 where the ascending tables are traversed in order to provide compressed data, as described below with particular reference to FIG. 11. As discussed in greater detail below, the ascending tables provide a compact representation of the wavelet coefficients and thereby facilitate compression analysis.

Figure 11:
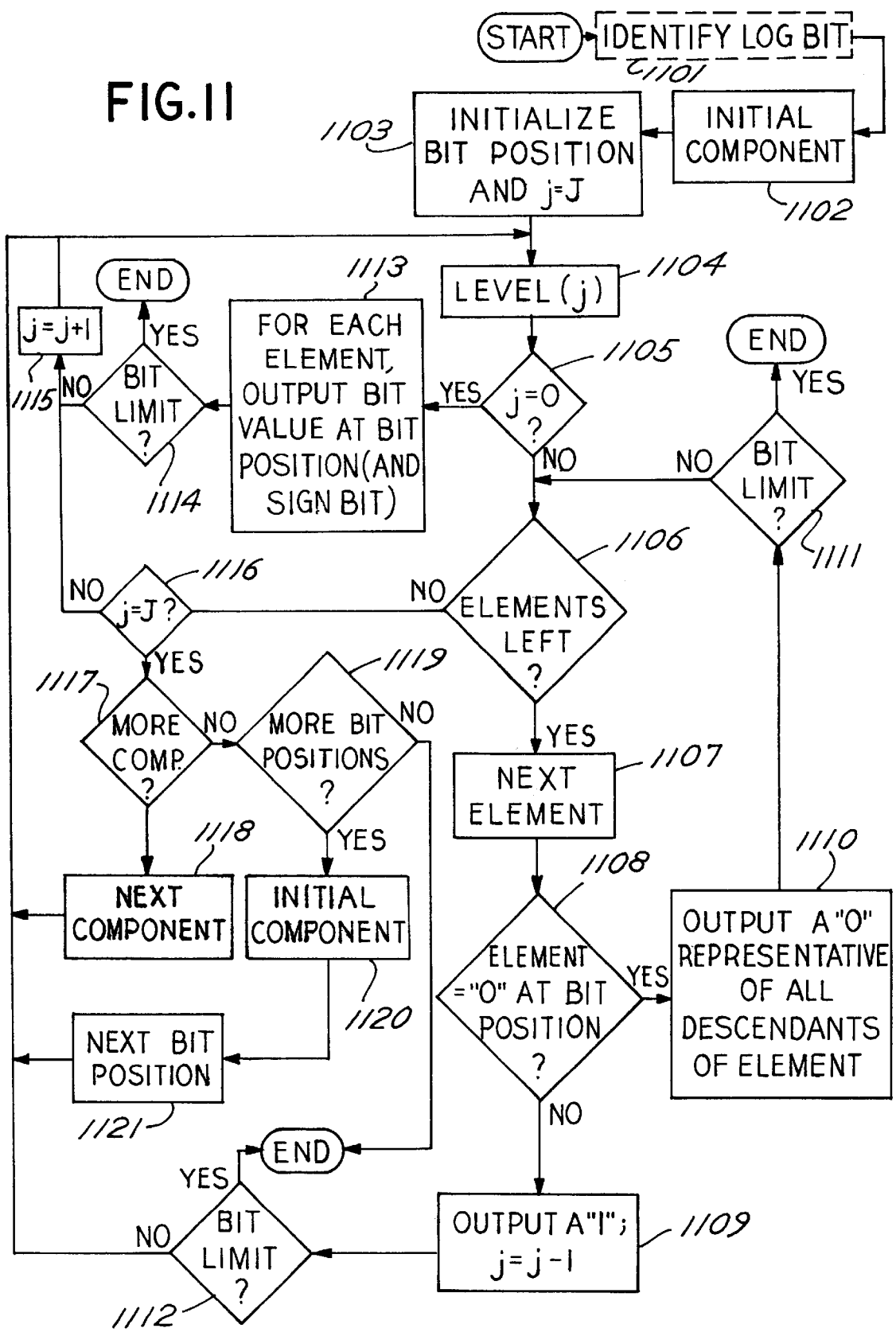
FIG. 11 is a flow chart illustrating a second method for providing compressed video data in accordance with the present invention.

FIG. 11 illustrates another method for providing compressed data particularly based upon the use of the ascending tables described above with reference to FIG. 9. The steps illustrated in FIG. 11 can be implemented by the video compressor 200 described above, in particular the ADK compressor 208. It is assumed that, prior to execution of the method of FIG. 11, ascending tables, as described above, have been created for each component (Y, $C_r$, $C_b$) of the video frame to be compressed. At step 1101, a log bit position is optionally identified for each of the Y, $C_r$ and $C_b$ components in the same manner as described above with regard to step 602. Again, the maximum of these three log bit positions is preferably provided as output of the compression process, although each may be provided separately as output. At step 1102, the ascending tables for any one of the components is accessed as the initial component to be analyzed, although the ascending tables for the luma component are preferred as the initial component.

An analysis bit position is initialized at step 1103. Although the analysis bit position could be initialized to any bit position, the analysis bit position is preferably initialized to the log bit position value (when a log bit position has been provided) and decremented throughout the rest of the compression process. Furthermore, at step 1103, a recursion indicator, j, is initialized to its maximum value J. The recursion indicator described herein is used for illustration purposes only; as those having ordinary skill in the art will recognize, many techniques exist for implementing recursive procedures. In the implementation illustrated in FIG. 11, the value of the recursion indicator at any given time is indicative of which level of the ascending tables is currently under consideration; the maximum value J indicates that the highest level table is currently being considered, while progressively smaller values correspond to progressively lower table levels.

At step 1104, the level (j) table is accessed. Where j=J, the table accessed is the highest level table for the component currently under analysis. Referring to the example illustrated in FIG. 10, the table of reduced coefficients in FIG. 10C is the highest level table. At step 1105, it is determined if the table currently being traversed is a level 0 table. If not, it is then determined at step 1106 whether there are any data elements in the level (j) table remaining to be analyzed. If so, the next data element is accessed at step 1107 and, at step 1108, it is determined whether the reduced data element comprises a first bit value at the analysis bit position, wherein the first bit value is a "0" bit value in a preferred embodiment. (Note that any data element analyzed at step 1108 is a reduced data element in light of step 1105.) If the first bit value is detected at step 1108, then, at step 1110, the first bit value is provided as output representative of all of the descendants of that data element at the analysis bit position. Referring again to FIG. 10, it is assumed that all of the bit values shown correspond to a P'th bit position and that the analysis bit position is currently set to the P'th bit position as well. Further assume that the data element currently under consideration is the data element labeled "AB" in FIG. 10B. Upon determining that the "AB" data element comprises a "0" bit value at the P'th bit position, a "0" bit value is output in order to represent each of the descendants of "AB". Stated another way, because the data elements labeled "ABx" (where x is any of "A", "B", "C" and "D") all comprise "0" bit values at the P'th bit position, it is sufficient to output a single "0" bit value representative of all four data elements. Compression is thereby provided because a receiving entity will recognize that this "0" bit value output is representative of all four data elements labeled "ABx". Maximum compression is provided when a data element at the highest level table (level J) comprises a "0" bit value at the analysis bit position because it allows a single output bit to represent the largest possible number of descendants at the analysis bit position. At step 1111, it is determined whether a bit limit for the current frame has been reached and, if not, the processing of additional data elements, if any, continues at step 1106.

If the second bit value is detected for any data reduced data element at step 1108, then the second bit value is provided as output at step 1109. The second bit value output at this point will indicate to a receiving entity that a recursion has occurred and that processing will continue at the next lowest table level. To this end, the recursion indicator, j, is decremented. If, at step 1112, the output bit limit for the current frame being analyzed has not been exceeded, processing continues at step 1104 where the children of the data element considered at step 1108 are analyzed in the manner described above relative to steps 1104–1111.

Special treatment is provided to those data elements residing in a level 0 table. Referring again to FIG. 10, the data element labeled "A" would be causing the process to recurse down to the data element labeled "AA". Likewise, processing would again recurse down to the descendants of "AA", i.e., data elements "AAx". Thus, at step 1105, the test for j=0 would be true and processing would continue at step 1113. At step 1113, each of the elements is separately treated in a predetermined order, such as the "z" pattern discussed above relative to FIG. 7, although any such pattern could be used. For each data element, the bit value at the analysis bit position is determined and treated in accordance with the following steps:

1) When a "0" bit value is encountered, output a "0" and go to the next data element;
2) When a "1" is encountered, output a "1" and check the tag bit associated with that data element. If the tag bit for that data element is set, then the sign bit for that data element has already been output and processing can continue at the next data element. If the tag bit is not set, output the sign bit for that data element, set the tag bit and go to the next element. (This process assumes that the tag bits are initially cleared. The polarity of the tag bits could just as easily be reversed to achieve the same function, in which case the tag bits would initially be set.) Once the level 0 data elements have been processed in this manner, a check is made at step 1114 to ensure that the bit limit for the current frame has not been exceeded. If not, the recursion indicator, j, is incremented at step 1115, thereby returning the process to the next highest level (level 1) for processing of additional elements, if any, at that level.

When it is determined, at step 1106, that there are no more elements left to process at a given level (except level 0), processing continues at step 1116 to determine whether the current level just completed is the highest level (J). If not, the recursion indicator, j, is incremented at step 1115, thereby returning the process to the next highest level for processing of additional elements, if any, at that level. For example, referring to FIG. 10, when the data elements labeled "ADx" shown in FIG. 10A have completed processing in accordance with step 1113, the process will recurse, via steps 1116 and 1115, back up to the table shown in FIG. 10B. Since there are no more elements left to process at this level (data element "AD" having been the last child data element at this level to be processed), the process will again recurse back up to the table shown in FIG. 10A. At this level, the test at step 1116 will be true (data element "D" having been the last data element at this level to be processed) and processing will continue at step 1117.

In essence, the method of FIG. 11, to the point it has been described thus far, examines each data element found in the highest level table of the ascending tables and, where necessary, traverses down into the tree structure (i.e., the descendants of each data element) to identify those data elements that may be most compactly represented. Referring again to FIG. 10, a traversal of the tree corresponding to the reduced data element labeled "A" would proceed as follows (assuming that no sign bits have yet been output). Starting with the "A" reduced data element, a bit value of "1" is encountered, so a "1" is output and the descendants of "A" ("AA", "AB", "AC", "AD") are considered. The "AA" reduced data element also has a "1" value, so a "1" is output and the descendants of "AA" ("AAA", "AAB", "AAC", "AAD") are considered. Note that the descendants of "AA" are all level 0 data elements in this example. The "AAA" data element is a "0", so a "0" is output. The "AAB" data element is a "1" and the corresponding tag bit is not yet set (per example rules), so a "1" is output followed by the sign bit for "AAB", and corresponding tag bit is set. The "AAC" data element is a "1", so a "1" is output followed by the sign bit for "AAC", and the corresponding tag bit is set. The "AAD" data element is a "0", so a "0" is output. This completes the processing of the descendants of "AA", so processing continues with the "AB" data element, another descendant of "A". The "AB" data element is a "0", so a "0" is output. The "AC" element is also a "0", so another "0" is output. The "AD" data element is a "1", so a "1" is output and processing continues at Level 0 for consideration of the descendants of "AD" ("ADA", "ADB", "ADC", "ADD"). The "ADA" data element is a "1", so a "1" is output followed by the sign bit for "ADA", and the corresponding tag bit is set. The "ADB" data element is a "0", so a "0" is output. The "ADC" data element is a "1", so a "1" is output followed by the sign bit for "ADC", and the corresponding tag bit is set. Finally, the "ADD" data element is "0", so a "0" is output. This completes the processing for the "A" data element and all of its descendants. If the sign bits are represented by the symbol "s", the output resulting from the traversal of the "A" data element and its descendants results in the following bit stream: 1, 1, 0, 1, s, 1, s, 0, 0, 0, 1, 1, s, 0, 1, s, 0. The traversal of the "B" data element and its descendants results in the following bit stream: 1, 1, 1, s, 0, 0, 0, 0, 0, 1, 0, 1, s, 0, 0. The traversal of the "C" data element and its descendants results in the following bit stream: 1, 0, 1, 1, s, 0, 0, 0, 0, 1, 1, s, 0, 1, s, 0. Finally, the traversal of the "D" data element and its descendants results in the following bit stream: 1, 1, 0, 0, 1, s, 0, 0, 1, 1, s, 0, 1, s, 0, 0.

Thus, the total number of bits used to represent the descendants of the "A", "B", "C" and "D" data elements, in this example, is 64 bits, including sign bits. In contrast, if all of the descendants of the "A", "B", "C" and "D" data elements (and the corresponding sign bits, according to the same rules) were output without the benefit of the instant invention, a total of 76 bits would be required. This corresponds to more than a 15% lossless reduction in the required amount of data, in this example. Of course, the occurrence of "0" values at higher table levels presents even greater opportunities for data compression. In practice, it has been found that wavelet coefficients at the higher spatial frequencies often comprise a substantial number of "0" bit values (in accordance with the fact that most information in an image is found at the lower spatial frequencies). As a result, substantial compression ratios can be achieved on wavelet coefficient data using relatively modest computational resources. For example, compression ratios of 100:1 can be achieved in real-time with acceptable video quality.

Returning again to FIG. 11, when the compression of all data elements at the current analysis bit position has been performed for the component currently being analyzed (i.e., the "Yes" branch out of step 1116), the process will continue at step 1117. At step 1117, it is determined whether more components remain to be analyzed at the current analysis bit position. In a preferred embodiment, the luma component is analyzed first at the first analysis bit position, followed by each of the chroma components at the first bit position. This order is repeated for subsequent bit positions until the bit limit is met or all components have been processed at all bit positions. If more components remain to be analyzed at the current analysis bit position, then the ascending tables for the next component are accessed at step 1118, and processing returns to step 1104 for analysis of the new component at the current analysis bit position.

If, however, no more components remain to be analyzed at the current analysis bit position, processing continues at step 1119 where it is determined whether any more bit positions remain to be analyzed. If not, then all components have been analyzed at all possible bit positions and processing for the frame is concluded. (Note that if all components have been analyzed at all bit positions before the bit limit has been reached, the remaining bit budget up to the bit limit can be stuffed with dummy data bits in order to preserve bit boundaries.) If, however, additional bit positions remain to be analyzed, the ascending tables for the initial component (i.e., the same component as selected at step 1102) are accessed at step 1120 and, at step 1121, the next bit position is designated as the analysis bit position. In a preferred embodiment, step 1121 comprises a step of decrementing the analysis bit position to the next most significant bit position. Processing may then resume at step 1104.

Figure 12:
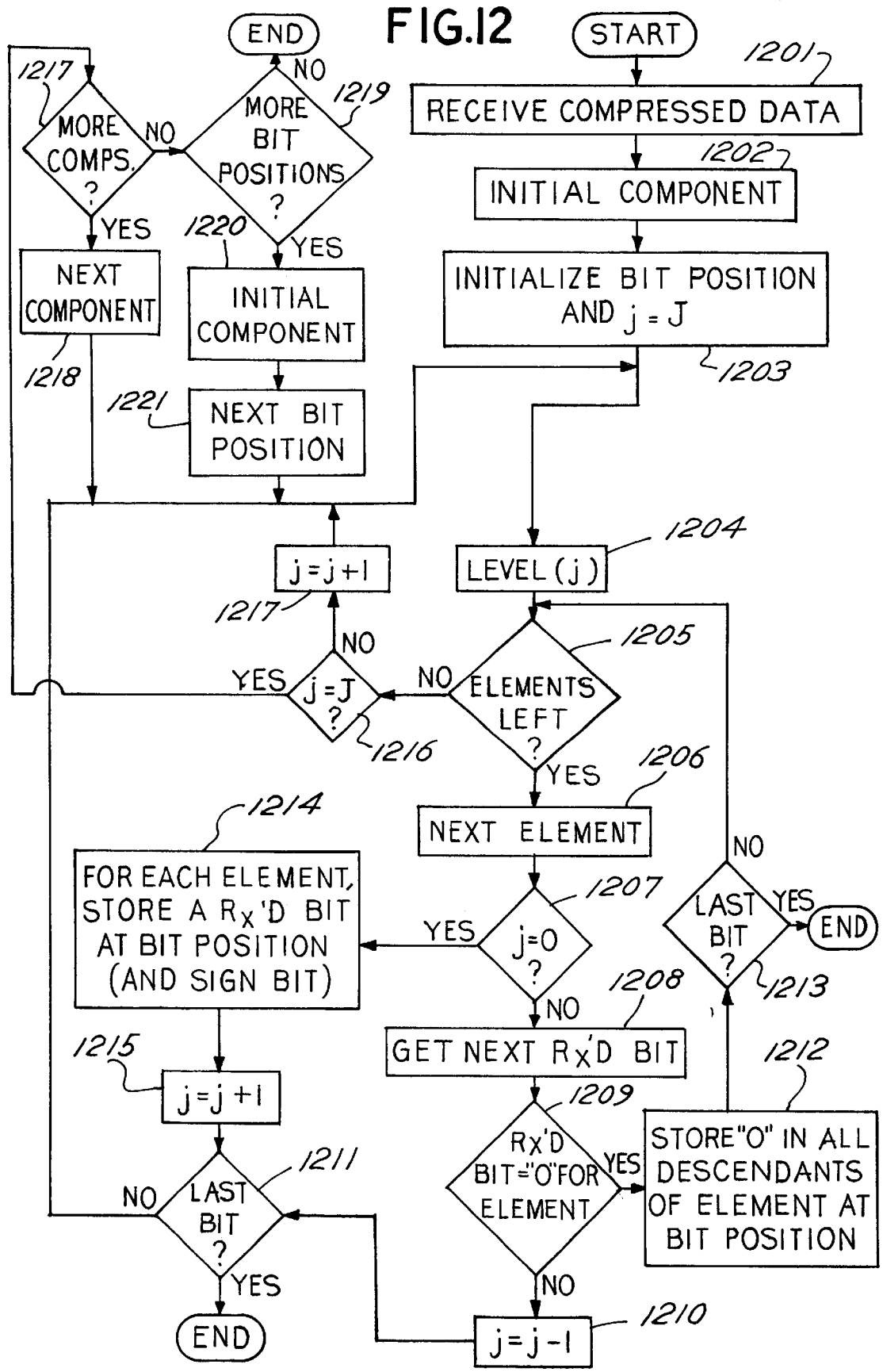
FIG. 12 is a flow chart illustrating a second method for providing decompressed video data in accordance with the present invention.

FIG. 12 is a flowchart illustrating another method for providing decompressed video data. The steps illustrated in FIG. 12 can be implemented by the video decompressor 200 described above, in particular the ADK decompressor 304. The method illustrated in FIG. 12 is complementary to the method described above relative to FIG. 11. At step 1201, compressed data, such as that provided by the method illustrated in FIG. 11, is received. In a preferred embodiment, the compressed data comprises compressed video data and includes data representative of a log bit position as described above.

At step 1202, storage for ascending tables corresponding to any one of the components (Y, $C_r$, $C_b$) is accessed as the initial component to be synthesized. In a preferred embodiment, the luma component is the initial component.

A synthesis bit position is initialized at step 1203. Although the synthesis bit position could be initialized to any bit position, the synthesis bit position is preferably initialized to the log bit position value (when a log bit position has been provided) and decremented throughout the rest of the decompression process. Furthermore, at step 1203, a recursion indicator, j, is initialized to its maximum value J. The recursion indicator described herein is used for illustration purposes only; as those having ordinary skill in the art will recognize, many techniques exist for implementing recursive procedures. In the implementation illustrated in FIG. 12, the value of the recursion indicator at any given time is indicative of which level of the ascending tables is currently being reconstructed; the maximum value J indicates that the highest level table is currently being synthesized, while progressively smaller values correspond to progressively lower table levels.

At step 1204, the storage area for a level (j) ascending table is accessed. Where j=J, the storage area corresponds to the highest level table for the component currently being reconstructed. At step 1206, it is determined whether there are any data elements in the level (j) table remaining to be synthesized at the current synthesis bit position. If so, the next data element is accessed at step 1207 and, at step 1208, it is determined if the table currently being reconstructed is a level 0 table. If not, processing continues at step 1208 where the next received bit from the received compressed data is analyzed. Assuming no uncorrectable errors have occurred in the received compressed data during transit, the received bit analyzed at step 1208 should correspond to the data element currently under consideration. At step 1209, it is determined whether the received bit comprises a first bit value, wherein the first bit value is a "0" bit value in a preferred embodiment. (Note that any data element considered at step 1209 is a reduced data element in light of step 1207.) If the first bit value is detected at step 1208, then, at step 1212, the first bit value is stored at the synthesis bit position in all of the descendants of the current reduced data element. For example, referring to FIG. 10, assume that the data element currently under consideration is the data element labeled "AB" in FIG. 10B. Upon determining that the received bit corresponding to the "AB" data element comprises a "0" bit value, a "0" bit value is stored at the synthesis bit position in each of the descendants of "AB" ("ABA", "ABB", "ABC" and "ABD"). In practice, all data elements are initialized to all "0" bit values, thereby eliminating the need to actually write a "0" bit value into memory. At step 1213, it is determined whether a bit limit for the current frame has been reached and, if not, the processing of additional data elements, if any, continues at step 1205.

If the second bit value is detected at step 1209, it is an indication that a recursion to the next lowest table level must occur. To this end, the recursion indicator, j is decremented at step 1210. It should be noted that the overall goal of the process illustrated in FIG. 12 is to recreate the data elements that were originally compressed to provide the compressed data, i.e., the level 0 table. As a result, it is not strictly required that higher level ascending tables (at levels 1 through J) be reconstructed as well, although they may. If the higher level ascending tables are being reconstructed, then the second bit value can also be stored in the corresponding data element in the level (j) table (prior to decrementing the recursion index) at step 1210. If, at step 1211, the bit limit for the current frame has not been exceeded, processing continues at step 1204 where the children of the data element considered at step 1209 are analyzed in the manner described above relative to steps 1204–1213.

Special treatment is provided when reconstructing those data elements residing in a level 0 table. When, at step 1207, it is determined that the current level under consideration satisfies the test j=0, processing continues at step 1214. At step 1214, each of the data elements to be populated are separately treated in a predetermined order, such as the "z" pattern discussed above relative to FIG. 7, although any such pattern could be used. For each data element, the bit value at the synthesis bit position is determined based on received bits from the compressed data in accordance with the following steps:

1) When a "0" bit value is encountered, store a "0" and go to the next data element;
2) When a "1" is encountered, store a "1" and check the tag bit associated with that data element. If the tag bit for that data element is set, then the sign bit for that data element has already been stored and processing can continue at the next data element. If the tag bit is not set, store the next received bit as the sign bit for that data element, set the tag bit and go to the next element. (This process assumes that the tag bits are initially cleared. The polarity of the tag bits could just as easily be reversed to achieve the same function, in which case the tag bits would initially be set.)

This process is repeated until the bit values at the bit position of each data element in the respective sub-blocks have been stored. The tag bits for a given data element ensures that the sign bit for that element is stored when the first "1" bit value for that data element is stored, and it ensures that the sign bit for that element only gets sent once. The particular pattern used to traverse the data elements is a matter of design choice, but in any event should be identical to that used during the analysis/compression process. The recursion indicator, j, is incremented at step 1215, thereby returning the process to the next highest level (level 1) for processing of additional elements, if any, at that level. Prior to this, however, a check is made at step 1211 to ensure that the bit limit for the current frame has not been exceeded. If not, processing continues at step 1204.

When it is determined, at step 1205, that there are no more elements left to process at a given level (except level 0), processing continues at step 1216 to determine whether the current level just completed is the highest level (J). If not, the recursion indicator, j, is incremented at step 1217, thereby returning the process to the next highest level for processing of additional elements, if any, at that level. When the reconstruction of all data elements at the current synthesis bit position has been performed for the component currently being synthesized (i.e., the "Yes" branch out of step 1216), the process will continue at step 1217. At step 1217, it is determined whether more components remain to be synthesized at the current synthesis bit position. In a preferred embodiment, the luma component is synthesized first at the first synthesis bit position, followed by each of the chroma components at the first bit position. This order is repeated for subsequent bit positions until the bit limit is met or all components have been processed at all bit positions. If more components remain to be synthesized at the current synthesis bit position, then the storage area corresponding to the ascending tables for the next component are accessed at step 1218, and processing returns to step 1204 for reconstruction of the new component at the current synthesis bit position.

If, however, no more components remain to be synthesized at the current synthesis bit position, processing continues at step 1219 where it is determined whether any more bit positions remain to be synthesized. If not, then all components have been synthesized at all possible bit positions and processing for the frame is concluded. (Note that if all components have been synthesized at all bit positions before the bit limit has been reached, the remaining received bits from the compressed data are preferably dummy data bits provided in order to preserve bit boundaries, and can be ignored.) If, however, additional bit positions remain to be synthesized, the storage area corresponding to the ascending tables for the initial component (i.e., the same component as selected at step 1202) is accessed at step 1220 and, at step 1221, the next bit position is designated as the synthesis bit position. In a preferred embodiment, step 1221 comprises a step of decrementing the synthesis bit position to the next most significant bit position. Processing may then resume at step 1204.

What has been described is merely illustrative of the application of the principles of the present invention. Other arrangements and methods can be implemented by those skilled in the art without departing from the spirit and scope of the present invention.

What is claimed is:

1. A method of processing video data for compression, the method comprising steps of:
 (A) providing the video data as input data, each data element of the input data being represented by a predetermined number of bits; and
 (B) for at least one bit position of a plurality of bit positions representative of the predetermined number of bits:
  (i) grouping data elements of the input data to provide a plurality of data blocks each having block dimensions smaller than the input data;
  (ii) when all data elements of the data block comprise a first bit value at the bit position, outputting the first bit value as representative of all data elements of the data block at the bit position; and
  (iii) when any data element of the data block comprises a second bit value at the bit position, outputting the second bit value and recursively treating each data block of the plurality of data blocks as the input data in accordance with steps (i) through (iii) until minimum block dimensions are reached.

2. The method of claim 1, wherein step (B) further comprises a step of:
 (iv) when the minimum block dimensions are reached, outputting, for each data block of the plurality of data blocks, a data bit representative of each data element of the data block at the bit position.

3. The method of claim 2, wherein step (B)(iv) further comprises steps of:
 (a) when the data bit representative of the data element comprises the second bit value and when a tag bit corresponding to the data element is not set, for each data element of the data block, outputting a sign bit corresponding to the data element; and
 (b) setting the tag bit corresponding to the data element.

4. The method of claim 1, further comprising steps of:
 (C) identifying a maximum data element having greatest magnitude in the video data;
 (D) determining a most significant bit of the maximum data element that is set to the second bit value to identify a log bit position; and
 (E) outputting data representative of the log bit position.

5. The method of claim 4, wherein the plurality of bit positions are treated in order from the log bit position to a least significant bit position.

6. The method of claim 1, wherein the minimum block dimensions correspond to 2×2 blocks.

7. The method of claim 1, wherein the video data comprises wavelet coefficients resulting from wavelet transform of any one of luma data, chroma red data and chroma blue data.

8. The method of claim 1, wherein the data elements are represented in signed magnitude format.

9. The method of claim 1, wherein the first bit value is a binary zero value and the second bit value is a binary one value.

10. A method of processing data for decompression to provided decompressed video data, the method comprising steps of:
 (A) providing a data storage area as an output storage area, each data element of the data storage area being represented by a predetermined number of bits;
 (B) receiving compressed video data to provided received bits;
 (C) for at least one bit position of a plurality of bit positions representative of the predetermined number of bits:
  (i) grouping data elements of the output storage area to provide a plurality of data blocks each having block dimensions smaller than the output storage area;
  (ii) when one of the received bits, corresponding to a data block of the plurality of data blocks, comprises a first bit value, storing the first bit value in each data element of the data block at the bit position;
  (iii) when one of the received bits, corresponding to a data block of the plurality of data blocks, comprises a second bit value recursively treating the data block as the output storage area in accordance with steps (i) through (iii) until minimum block dimensions are reached.

11. The method of claim 10, wherein step (C) further comprises a step of:
 (iv) when a data block of the plurality of data blocks has the minimum block dimensions, storing, in each data element of the data block, a corresponding one of the received bits at the bit position.

12. The method of claim 11, wherein step (C)(iv) further comprises a step of:
  (a) for each data element of the data block, when the corresponding one of the received bits comprises the second bit value and when a tag bit corresponding to the data element is not set, storing a subsequently received one of the received bits as a sign bit corresponding to the data element; and
  (b) setting the tag bit corresponding to the data element.

13. The method of claim 10, wherein the received bits comprise data representative of a log bit position, the log bit position indicative of a most significant bit of the data elements of the data storage area that is to be set to the second bit value.

14. The method of claim 13, wherein the plurality of bit positions are treated in order from the log bit position to a least significant bit position.

15. The method of claim 10, wherein the minimum block dimensions correspond to 2×2 blocks.

16. The method of claim 10, wherein the decompressed video data comprises wavelet coefficients resulting from wavelet transform of any one of luma data, chroma red data and chroma blue data.

17. The method of claim 10, wherein the data elements are represented in signed magnitude format.

18. The method of claim 10, wherein the first bit value is a binary zero value and the second bit value is a binary one value.

19. A method of processing video data for compression, wherein the video data has been processed via a discrete wavelet transform to provide wavelet coefficients, the method comprising steps of:
  (A) storing the wavelet coefficients as data elements in a level 0 table, each wavelet coefficient being represented by a predetermined number of bits and the level 0 table forming a portion of a plurality of ascending tables;
  (B) constructing other tables of the plurality of ascending tables by performing steps of, for J=1 to K:
    (i) grouping the data elements from the level (J−1) table to provide a plurality of data element blocks;
    (ii) for each data element block of the plurality of data element blocks, forming a reduced data element by bitwise logically OR'ing the data elements forming the data element block, wherein the data elements of the data element block are children of the reduced data element; and
    (iii) storing the reduced data elements in a level (J) table of the plurality of ascending tables.

20. The method of claim 19, wherein each data element block of the plurality of data element blocks comprises a 2×2 block.

21. The method of claim 19, wherein the video data comprises at least one of luma data, chroma red data and chroma blue data.

22. The method of claim 19, wherein the wavelet coefficients are represented in signed magnitude format.

23. The method of claim 19, wherein the wavelet coefficients comprise a tag bit.

24. The method of claim 19, further comprising steps of:
  (C) identifying a maximum wavelet coefficient having greatest magnitude in the level 0 table;
  (D) determining a most significant bit of the maximum wavelet coefficient that is set to a binary one value to identify a log bit position; and
  (E) outputting data representative of the log bit position.

25. The method of claim 24, further comprising steps of:
  (F) performing at least one descending tree search on the plurality of ascending tables, wherein each descending tree search uniquely corresponds to a bit position of a plurality of bit positions inclusively between the log bit position and a least significant bit position.

26. The method of claim 25, wherein each descending tree search further comprises a step of:
  (i) traversing the plurality of ascending tables and identifying a binary value of each data element of the plurality of ascending tables at the bit position and outputting compressed data in accordance with steps of:
    (a) when a binary zero value is identified for a data element in the level 0 table, outputting a binary zero value representative of the data element at the bit position;
    (b) when a binary one value is identified for a data element in the level 0 table, outputting a binary one value representative of the data element at the bit position;
    (c) when a binary zero value is identified for a data element in the level (J) table for any J=1 to K, outputting a binary zero value representative of all descendants of the data element at the bit position, and thereafter skipping the step of identifying for all descendants of the data element at the bit position; and
    (d) when a binary one value is identified for a data element in the level (J) table for any J=1 to K, outputting a binary one value and recursively treating the children of the data element in accordance with steps (a) through (d).

27. The method of claim 26, wherein step (i)(b) further comprises steps of:
  (1) when a tag bit corresponding to the data element is not set, outputting a sign bit corresponding to the data element; and
  (2) setting the tag bit corresponding to the data element.

28. The method of claim 25, wherein the bit position is initially the log bit position and is decremented for each successive descending tree search.

29. The method of claim 27, further comprising steps of:
  (G) providing a plurality of decoded ascending tables comprising decoded level (J) tables for J=0 to K, each data element of the plurality of decoded ascending tables being represented by a predetermined number of bits;
  (H) receiving the compressed data and the data representative of the log bit position; and
  (I) populating the plurality of decoded ascending tables by performing at least one descending tree decoding based on the compressed data, wherein each descending tree decoding uniquely corresponds to a decoded bit position of a plurality of bit positions inclusively between the log bit position and a least significant bit position.

30. The method of claim 29, wherein each descending tree decoding further comprises a step of:
  (J) traversing the plurality of decoded ascending tables and storing in each data element of the plurality of decoded ascending tables, at the decoded bit position, a binary value of the compressed data in accordance with steps of:
    (i) when a binary zero value is identified from the compressed data and a data element from the level 0 table is to be populated, storing a binary zero value in the data element at the decoded bit position;

(ii) when a binary one value is identified from the compressed data and a data element from the decoded level 0 table is to be populated, storing a binary one value in the data element at the decoded bit position;

(iii) when a binary zero value is identified from the compressed data and a data element in the decoded level (J) for J=1 to K is to be populated, storing a binary zero value, at the decoded bit position, in all descendants in the decoded level 0 table of the data element and thereafter skipping the step of storing, at the decoded bit position, for all descendants of the data element; and (iv) when a binary one value is identified from the compressed data and a data element in the decoded level (J) for J=1 to K is to be populated, storing a binary one value, at the decoded bit position, in the data element and recursively treating the children of the data element in accordance with steps (i) through (iv).

* * * * *